UNITED STATES PATENT OFFICE.

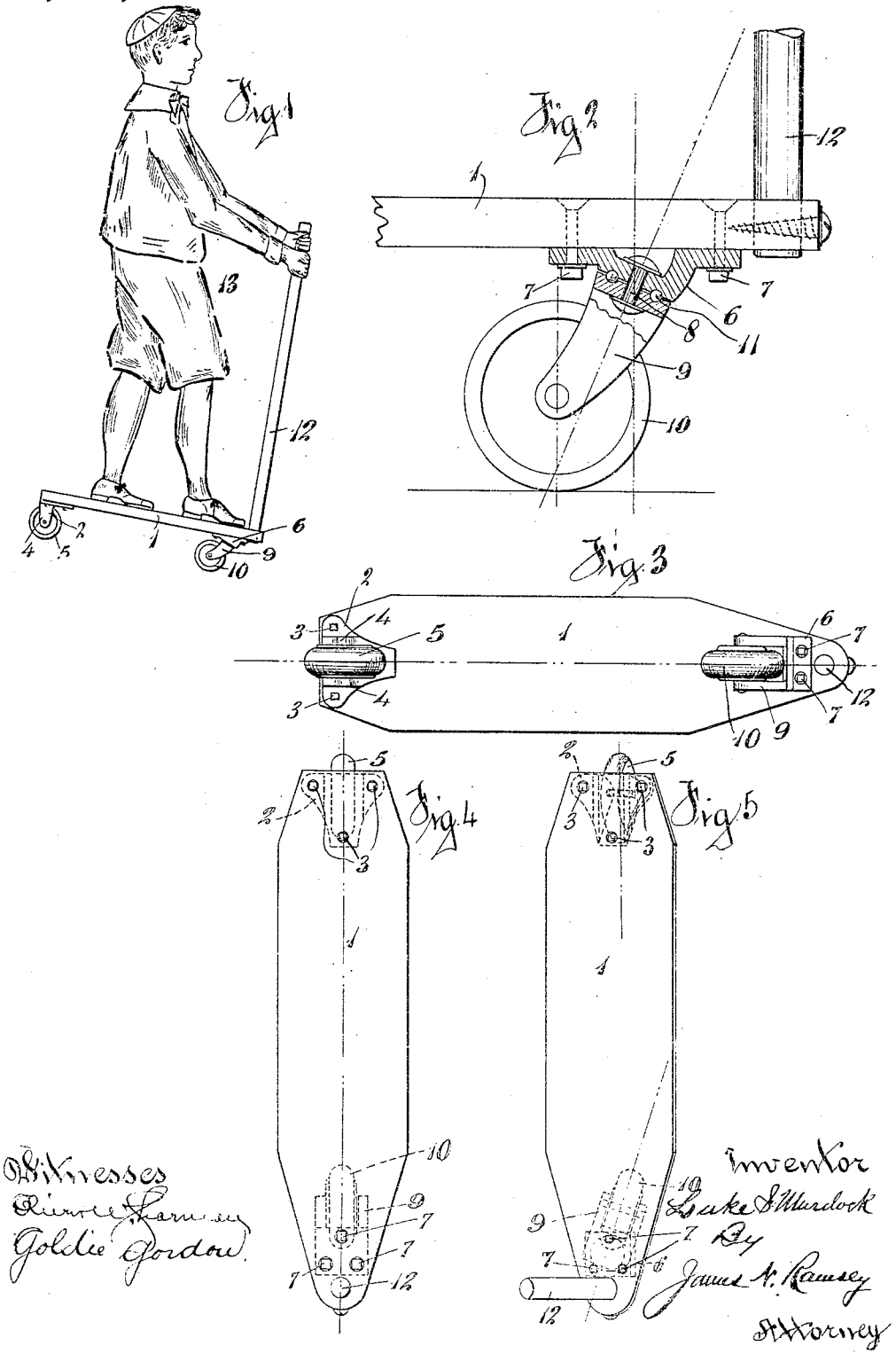

LUKE S. MURDOCK, OF CINCINNATI, OHIO.

COASTER.

1,056,357.  Specification of Letters Patent.  Patented Mar. 18, 1913.

Application filed October 12, 1911. Serial No. 654,253.

*To all whom it may concern:*

Be it known that I, LUKE S. MURDOCK, a citizen of the United States, residing at Cincinnati, in the county of Hamilton and State of Ohio, have invented certain new and useful Improvements in Coasters, of which the following is a specification.

My invention relates to a novel vehicle, coaster or conveyance and means for automatically steering and balancing the same.

The object of my invention is to provide a novel, light, economically constructed, conveniently operated and easily balanced coaster or conveyance which may be instantly mounted dismounted and re-mounted and which is adapted to afford an attractive and amusing mode of coasting or traveling.

Other objects, purposes and advantages of my invention will be set forth herein.

My invention consists of tread members, a supporting framework thereon, and a balancing handle attached thereto.

My invention also consists in the peculiar construction, combination and arrangement of the several parts as herein set forth and claimed.

In the drawing, which serves to illustrate the construction, use and operation of my invention: Figure 1 is a perspective view of the device showing it in operation; Fig. 2 is a view of part of the front end of the device, partly in side elevation and partly in vertical section; Fig. 3 is a bottom view; Fig. 4 is a top view showing the tread members in dotted lines; Fig. 5 is a top view of the device when balanced at an angle to the perpendicular.

In the embodiment of my invention, as illustrated, and which shows one form of construction, 1 represents the supporting member or platform of my coaster. This platform may be made of a board, strips of wood, metal or other suitable material. A stationary bracket 2 is secured to the under side of the rear end of said supporting member by bolts 3 or otherwise, and is provided with downwardly extending bifurcated or forked bearings 4 within which a wheel 5 is journaled and adapted to rotate, said bracket being fixed on said supporting member so that the wheel coincides with a line extending longitudinally through the center of said supporting member or platform.

A bracket 6 is secured to the lower front part of the supporting member 1 by any suitable means such as bolts 7, and one form of said bracket is shown in Fig. 2. To this bracket I pivotally secure by suitable means, as a bolt 8 or otherwise, a bifurcated or forked bearing 9 which projects downwardly and rearwardly from said bracket 6 and has a wheel 10 journaled therein. Ball bearings are preferably provided between the bracket 6 and the bifurcated bearing member 9 at the pivotal journal.

A handle 12 is secured at the front end of the supporting frame at an angle to the axis of the stationary tread member and is preferably secured in fixed relation to said supporting member, but may, if desired, be hinged thereto, to permit it to be compactly folded with said supporting frame. The tread members may consist of either wheels or runners, or may be otherwise constructed as desired. The tread members are mounted in alinement with each other when the coaster is moving in a straight line as shown in Fig. 3, but when said coaster is traveling on a curved line said treads will not be in alinement with each other, as shown in Fig. 5.

As shown in the drawing the support or bearing of the automatic front or steering tread is placed at an angle with relation to the perpendicular to the line of track made by the stationarily mounted tread member. Said construction makes it natural for the pivotally mounted tread member to swerve to one side when the weight of the operator and the device is thrown out of perpendicular by the balancing handle and provides a substantially automatic steering apparatus which will bring the supporting member or platform and the weight into perpendicular balance or erect position and the tread members into alinement or perfect track. The supporting member can be thrown out of perpendicular by the balancing handle and held there until the automatic steering member in its continued endeavor to bring the supporting platform and the weight into perpendicular balance, will turn a curve as the operator may desire. When the balance has been again thrown into perpendicular or erect position the automatic steering tread member immediately picks up the balance on the perpendicular and both the tread members will again run in perfect track, or in the same track on a straight line.

While the device is particularly adapted and intended for use in coasting down a sloping surface it should be understood that it is also well adapted and intended for use for traveling rapidly over level surfaces and in either case the balancing handle 12 enables the operator 13 to stand in an easy attitude or position upon the supporting platform or to propel, by the use of one foot against the ground, and by slight movements of the handle or body, or both, to maintain a perfect balance, conveniently and easily guiding the coaster either in straight or curved lines as may be desired.

The device is one which is adapted to develop skill and dexterity on the part of the boy or other operator, in traveling with speed and in balancing and steering upon either level or sloping surfaces.

The wheels or tread surfaces are preferably curved laterally to permit of a proper bearing upon the surface at whatever angle said treads may be balanced.

A coaster constructed in accordance with my invention permits the operator to ride thereon in a standing posture or in a sitting posture, if desired, and provides a device which is well adapted for use under varying conditions without or with snow, sleet or ice upon the surface by rolling or sliding.

My invention is capable of some modification without departure from the spirit or scope thereof, and I do not, therefore, wish to be confined to the exact details of construction as herein set forth.

I claim:

1. In a two-wheeled coaster, the combination of a supporting member, a stationary rear wheel, a self-steering front wheel mounted with its point of tread contact in the rear of its point of supporting connection.

2. In a two-wheeled coaster with the wheels thereof set in tandem, a supporting member, a stationarily mounted rear wheel attached thereto, a front wheel pivotally attached at an angle to the perpendicular to said supporting member with the axle and point of tread of said front wheel in the rear of its point of connection to the supporting member, and a balancing handle near the front end of the supporting member.

3. A coaster composed of a frame, a rear wheel centrally and stationarily mounted, a front wheel mounted centrally but free to move from side to side accordingly as the coaster frame is tilted and with its movable connection to the frame in advance of the wheel's axis, to cause a drag that will steer the wheel when the coaster frame is tilted, and suitable means for tilting the coaster frame as desired.

4. In a coaster the combination of two single point bearing wheels, a frame, a stationary forked wheel mounting, a backwardly inclined oscillating forked wheel mounting, and means for holding the frame in any desired position.

5. In a coaster, the combination of a frame, a stationary fork at the rear with a wheel mounted therein, a backwardly inclined and backwardly curved oscillating fork at the front with a wheel mounted therein, and means for holding the operator in position on said frame.

6. In a two-wheeled coaster with the wheels thereof set in tandem, a front steering wheel movably connected to the body of said coaster at such a backward angle that said front steering wheel will swerve from side to side to effect a steering when the angle of contact between said wheel and the ground is changed.

7. In a two-wheeled coaster with the wheels thereof set in tandem, a frame, a stationary back wheel, a movably connected front wheel set at a backward angle to said frame, and means for tilting said frame and holding it in any desired angle relative to the ground for controlling the position of the steering wheel.

8. In a vehicle, a single steering wheel mounted with its axis and point of bearing to the ground in the rear of its connection to the vehicle, with an independent free motion from side to side governed by its angle of contact with the ground and means for tilting the vehicle to vary the angle of contact with the ground to effect the steering desired.

LUKE S. MURDOCK.

Witnesses:
JAMES N. RAMSEY,
GOLDIE GORDON.